United States Patent
Hoenninger et al.

(10) Patent No.: US 6,260,058 B1
(45) Date of Patent: *Jul. 10, 2001

(54) PROCESS FOR CONTROLLING TECHNOLOGICAL OPERATIONS OR PROCESSES

(75) Inventors: Harald Hoenninger, Freiburg; Thomas Mocken, Bietigheim-Bissingen; Juergen Schiemann, Markgroeningen, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/776,469

(22) PCT Filed: Jul. 11, 1995

(86) PCT No.: PCT/DE95/00903

§ 371 Date: Apr. 14, 1997

§ 102(e) Date: Apr. 14, 1997

(87) PCT Pub. No.: WO96/02883

PCT Pub. Date: Feb. 1, 1996

(30) Foreign Application Priority Data

Jul. 19, 1994 (DE) .................................................. 44 25 431
Jan. 14, 1995 (DE) ............................................... 195 00 957

(51) Int. Cl.⁷ ...................................................... G06F 9/00
(52) U.S. Cl. ........................................... 709/107; 709/103
(58) Field of Search ..................................... 395/673, 672, 395/676, 677, 678; 709/103, 102, 106, 107, 108; 710/260

(56) References Cited

U.S. PATENT DOCUMENTS

| 4,736,318 | * | 4/1988 | Delyani et al. ....................... 364/200 |
| 4,954,948 | * | 9/1990 | Hira et al. ............................ 364/200 |
| 5,012,409 | * | 4/1991 | Fletcher et al. ...................... 363/200 |
| 5,193,189 | * | 3/1993 | Flood et al. ......................... 395/650 |
| 5,247,675 | * | 9/1993 | Farrell et al. ........................ 394/650 |
| 5,428,779 | * | 6/1995 | Allegrucci et al. .................. 395/650 |
| 5,448,735 | * | 9/1995 | Anderson et al. ................... 395/650 |
| 5,594,905 | * | 1/1997 | Mital .................................. 395/733 |
| 5,600,837 | * | 2/1997 | Artieri ................................. 395/673 |
| 5,627,745 | * | 5/1997 | Flood ................................. 364/131 |
| 5,632,032 | * | 5/1997 | Ault et al. ........................... 395/670 |
| 5,636,124 | * | 6/1997 | Rischar et al. .................. 364/468.06 |

FOREIGN PATENT DOCUMENTS

0332148 * 9/1989 (EP) ................................. G06F/9/46

* cited by examiner

*Primary Examiner*—Majid A. Banankhah
*Assistant Examiner*—Sue Lao
(74) *Attorney, Agent, or Firm*—Kenyon & Kenyon

(57) ABSTRACT

In the process for controlling industrial operations and processes, a complex control program is processed by a microprocessor of a controller (10) under real-time conditions. The complex control program is divided into tasks. Each task is assigned a priority and an activation event. The activated task with the highest priority for processing is selected. Processing of a task can be interrupted on the basis of a subsequent request for processing a higher-priority task Processing of the lower-priority task is continued at the point of the interruption, after the processing of the higher-priority task is concluded. This process is characterized in that tasks can be divided into a number of subtasks to be processed sequentially, and within configurable, coherent and non-overlapping priority ranges, tasks can interrupt other lower-priority tasks only between two successive subtasks or at interruption points explicitly inserted by the user. Processing of the higher-priority task requested later is not begun until processing of the subtask during which the request for processing the higher-priority task was issued has been completed.

20 Claims, 10 Drawing Sheets

PROCESS FOR CONTROLLING TECHNOLOGICAL OPERATIONS OR PROCESSES

FIELD OF THE INVENTION

The present invention relates to a process for controlling technological operations and processes.

BACKGROUND INFORMATION

A conventional process is described in an article by Bernd Ackermann, "Requirements of a real-time operating system for embedded systems," Elektronik, no. 18 (1992) pp. 120–128, which discusses features of controllers containing real-time operating systems for microprocessors. A process manager program is responsible for sequencing control. It controls the allocation of the CPU and coordinates all the programs (tasks) being run. The process manager allows quasi-parallel processing of several tasks (multitasking). For this purpose the process manager is designed so that it can interrupt a program currently being run at any time and can start a task having a higher priority for the system as a whole. The interrupted program is continued by the process manager when the processing of higher-priority programs is concluded. In this type of sequencing control, it is important that a task currently being run can be interrupted at any time. This procedure is also known as "preemptive scheduling or preemptive multitasking."

The sequencing control described above relates to real-time systems, e.g., control systems that must perform certain control processes within defined time limits, because this permits a rapid reaction to certain events.

However, a task can be interrupted at any point, which results in high management and memory demands. Since an interrupted task should be continued later at the point of interruption, information indicating the processing status must be saved for the interrupted task. This includes the program counter status, the contents of the status register, the contents of the computation register, etc. Furthermore, the temporary data of the interrupted task stored in the stack must be saved while extra space must be reserved in the stack memory for temporary data of the interrupting task. Since there can be several nested interruptions in the sequencing control, this process requires a large amount of storage space for the stack memory.

It is also difficult to exchange information between the interrupted and interrupting tasks. If both tasks access the same memory areas for this purpose, data may be lost or corrupted in some cases, depending on the location of the interruption. These cases are often difficult to detect in practice, and providing protection against them requires complex methods for synchronizing data access. As an alternative, separate memory areas can be used, in which case it is necessary to provide communication mechanisms which are also complex.

SUMMARY OF THE INVENTION

The process according to the present invention is advantageous since the management and storage requirements for interruptions in tasks are greatly reduced. Due to the fact that tasks from a stipulated priority range are subdivided into subtasks that are uninterruptible for tasks of the same priority range and thus mutual interruptions in the tasks can occur only between subtasks, very little information has to be stored in the stack memory for such interruptions. The memory required for this information does not depend on the number of temporary stack memory variables used in the subtasks or the nesting depth of the interruptions and thus it does not depend on the number of priority levels of the respective priority range. The stack memory required is therefore smaller than in preemptive multitasking.

Cooperative multitasking is a method of quasi-parallel processing of several tasks and thus allowing higher-priority tasks to interrupt lower-priority tasks only at certain program locations to be determined by the user when setting up the program. It has been found in practice that many tasks in an overall control program can be processed in cooperative multitasking with low demands regarding memory and computation time, while the more demanding preemptive multitasking can be limited to a few high-priority tasks.

The problem of possible data loss in accessing shared memory areas that occurs in preemptive multitasking is less critical with such process. In cooperative multitasking it is no longer possible to interrupt access to data also being accessed by the interrupting task because access is completed within the non-interruptible subtask, i.e., access to data is now automatically synchronized correctly. For the same reason, this also eliminates the problem of unrestricted reversal of priority which occurs in the preemptive system when a task is blocked in accessing a resource that can be assessed only by mutual exclusion because it is already busy with an interrupted low-priority task. The effects of task interruptions are thus transparent and easily reproduced. This is advantageous for programming tasks in higher programming languages because it is generally impossible to tell whether or not a high-level language construct is an interruptible operation.

Additional advantages for the development phase of a controller are also apparent. In particular, a complex control program can be simulated more easily. In contrast with preemptive multitasking, the chronological sequence of program processing and in particular the effects of interruptions can be largely simulated in the process according to the present invention without having to simulate the behavior of the computer itself. Thus, a running time must also be specified for each subtask in addition to the function. It is also advantageous that the tasks consist of a series of subtasks put together according to sequencing criteria. Sequencing criteria taken into account include the reason for the task processing request (activation event), the associated urgency (priority) and synchronization conditions between the subtasks. The configuration of many different subtasks according to sequencing criteria in processing sequences that are assigned to a few tasks with the respective priorities and reason for processing also reduces the running time required for sequencing control within the operating system which must be coordinated by processing the competing subtasks. A significant amount of the information on sequencing control is thus already made available in writing the program and need not be determined while the program is running, so that it adds to the running time. However, the complex controller program is divided into subtasks according to functional criteria. This increases transparency and simplifies the writing and management of programs.

It is further advantageous that the size of each subtask be designed so that the time for processing the subtask by the microprocessor does not exceed a predetermined limit. As a result, the process can also be used for control processes where strict real-time conditions must be taken into account within the predetermined time limit. Execution of an activated higher-priority task can then be delayed by at most the maximum processing time of a subtask plus the processing time of any interrupt programs.

The additional make it possible to easily change the processing sequence of subtasks while the program is running. To do so, a table pointer is simply loaded with the address of a subtask pointer from a subtask pointer table, so the subtask selected by this subtask pointer is called up with the next subtask change. Furthermore, changing between task is accomplished easily by loading the table pointer with the address of the first subtask pointer from the respective subtask pointer table of the task.

Introducing a descriptive data structure for a task (task descriptor) is advantageous since a task can be unambiguously identified with the address of a descriptive data structure and the latter permits simple and prompt access to all important information via this task and its processing status.

It is also advantageous if the status of the respective task can be characterized by one of the three status: "dormant," "ready" and "computing." Various problems of known operation systems are avoided since there is no "blocked" status for a task. A task assumes a "blocked" status only when it is waiting for a certain condition to be met. Examples include waiting for certain computation results of other tasks. If the computation results are not yet available, the dormant task is assigned a "blocked" status in the respective operating system. Processing of this task is then stopped for the first time. Another task must then be processed, namely one that may have a lower priority. Only when the specific condition has been met, e.g., the required computation results are made available by processing another task, can the operating system continue the task. However, these processes result in a more complicated sequencing control. In other words, the actual processing sequence is altered according to the priority levels. Thus, it is no longer possible to enter the temporary data of the interrupted task, to be saved in the case of task interruptions, in a single stack memory. This problem is eliminated with conventional operating systems e.g. by providing a separate stack memory for each task. However, this results in a great additional memory demand that is not acceptable for mass-produced controllers, in particular for automotive control systems.

The use of preconfigured subtask sequences that are stored in the memory in the form of subtask pointer tables and the administration of the sequencing control information in a table offer the advantage that analysis of the sequencing control information can be limited to the cases of task activation and task termination, i.e., it need not be performed again after each subtask processing.

When the requested task or another task having the same priority is already being processed, additional advantageous measures are evident. These measures ensure that in the event several tasks of the same priority are requested, the first task to be processed will always be the one having the longest waiting time.

Supplying an operating system subprogram that can be called up by the user offers the advantage that in dividing the complex controller program into subtasks, a subtask that forms a unit according to functional criteria and whose processing time exceeds the limit according to claim 3 need not be split into or two or more subtasks as a concession to real-time demands. The real-time requirements can be met by inserting additional interrupts at suitable locations by calling up the operating system subprogram provided for this purpose; the advantages of cooperative multitasking are thus preserved.

To be able to comply with very strict real-time conditions, it is advantageous to also allow mixed forms of sequencing control. The process according to the present invention allows is such a mixed form with the specific advantage that the reaction times of higher-priority preemptive tasks are not impaired by the running times of the subtasks of lower-priority tasks.

According to the process according to the present invention, a small number of the highest-priority tasks can be managed according to a related-art principle of sequencing control (preemptive multitasking) and strict real-time requirements (very short reaction times required) can be met, while the lower-priority tasks are managed according to the sequencing control principle of the process according to the present invention.

The process according to the present invention can be advantageously used to advantage when very high real time requirements are in effect for certain tasks whereas low real time requirements apply to other tasks. In such case, the tasks for which only low real-time requirements are in effect can be combined in one priority group within which the processor allocation is based exclusively on the principle of cooperative multitasking. For the other tasks with the strict real time requirements, the restriction to the given interrupt points in the lower-priority tasks does not apply, i.e., they can preemptively interrupt any lower-priority task from any groups. This permits a differential treatment of the tasks of an application with regard to sequencing control in accordance with their different real-time requirements. Thus the demand for computer resources can also be minimized by the optimally adapted combination of the two sequencing control methods described above, with the given real time requirements being always maintained. Another classification of the tasks by the sequencing control method according to the present invention is also provided. This classification into two priority ranges is very convenient, especially in a situation where a small portion of the real-time-critical tasks (top priority range) is processed according to the preemptive sequencing control method and generally a larger portion of tasks with low to moderate real-time demands (low priority range) is processed by the cooperative sequencing control method, where a task can be interrupted only between subtasks that have been concluded.

DETAILED DESCRIPTION OF THE INVENTION

Figure 1:
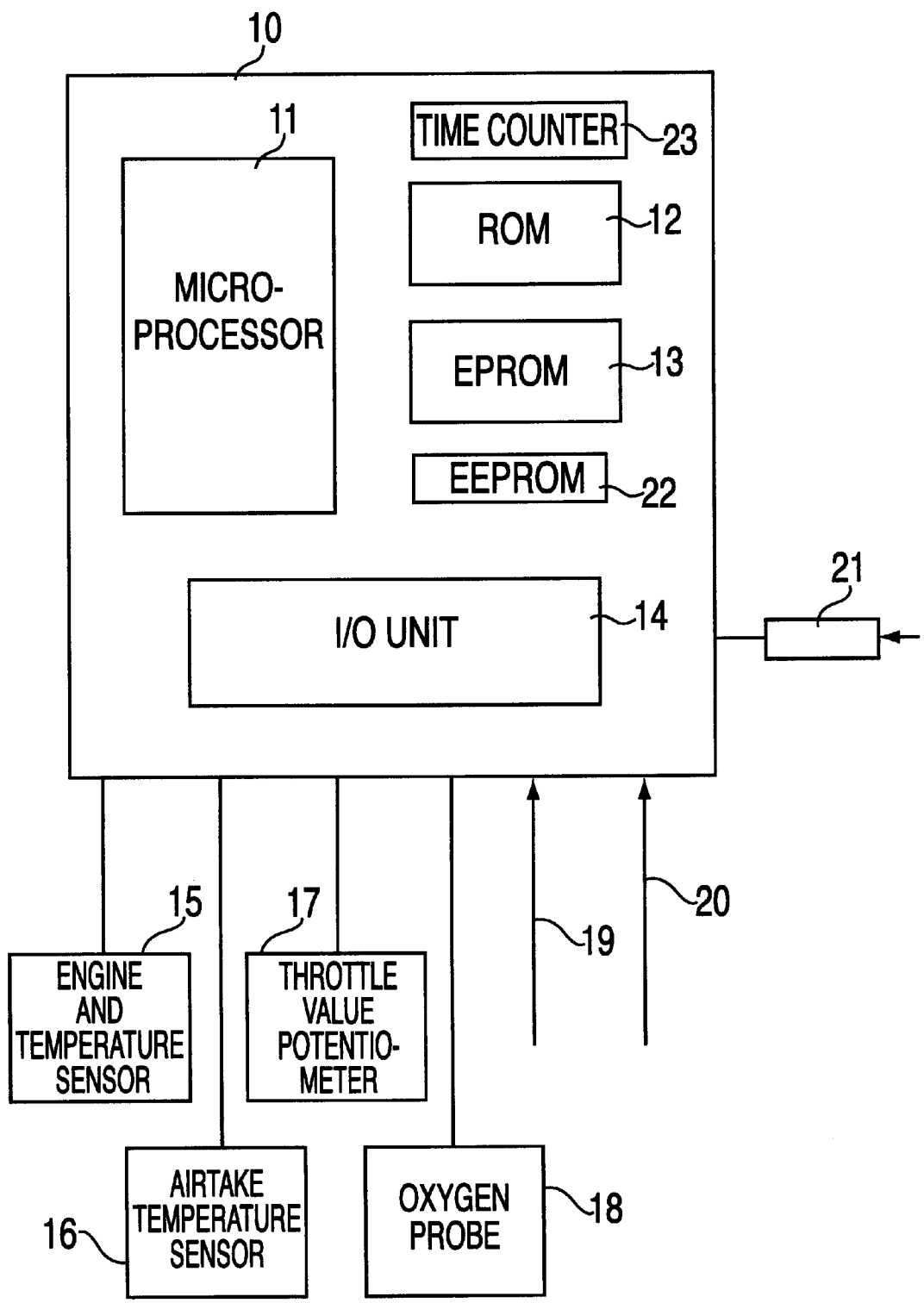
FIG. 1 shows a block schematic of a fuel injection controller for an internal combustion engine.

FIG. 1 shows a fuel injection controller 10 for an internal combustion engine. The microprocessor of the fuel injection controller is labeled as 11. The read-write memory (RAM) of controller 10 is labeled as 12. The read-only memory (EPROM) is labeled as 13 and a non-volatile read-write memory (EEPROM) of controller 10 is labeled as 22. An input/output unit of controller 10 is labeled as 14. A time counter of the controller is labeled as 23. The specific design of such a controller is known from the related art so it need not be explained further here. An engine temperature sensor 15, an intake air temperature sensor 16, a throttle valve potentiometer 17 and an oxygen probe 18 are connected to controller 10. A signal input from which the speed and the crankshaft angle can be calculated is labeled as 19. This signal is supplied to the injection controller by an ignition controller. The other input 20 is connected to the ignition lock. In addition, controller 10 is connected to an electromagnetic injection valve 21.

The function of the fuel injection controller is as follows: the fuel injection controller processes the input signals and calculates the injection time from them as a measure of the amount of fuel to be injected. Depending on engine speed and crankshaft angle, controller 10 triggers injection pulses at the precalculated injection times. The precise operation of the injection controller is described in the book Autoelektrik/Autoelektronic am Ottomotor (Automotive Electric and Electronic Systems of the Internal Combustion Engine), VDI Verlag, 1987, pp. 258–261, which is described below.

A complex control program is necessary to implement such a fuel injection controller. The complex control program is usually subdivided into a number of different tasks. It is advantageous to base this division into tasks on sequence criteria. In other words, there are program parts that must be processed within a fixed time reference. There are also program parts that are to be processed only within a certain operating mode or as a reaction to an external or internal event such as the program start, program, full-load operation, idling operation, warm-up operation, etc. In addition, certain program parts are to be processed according to the crankshaft angle within a fixed angle reference. All program parts to be processed within the same time and angle reference are combined into one task. Each task is then also characterized by an activation event that causes the task to be called up. For example, a task can be called up within a fixed time frame of time counter 23 that is incremented in the interrupt service routine of an interrupt generated periodically by the hardware, e.g., every millisecond. In this interrupt service routine, a check is performed to determine whether a new task should be activated at the current count of the time counter. To coordinate the task execute commands, it is advantageous to assign a certain priority to the individual tasks to indicate the urgency of processing the task. An operating system is often used to manage the processing of individual tasks. The operating system then decides on the basis of a corresponding program which task is to be processed by the microprocessor at a given time.

Figure 2:
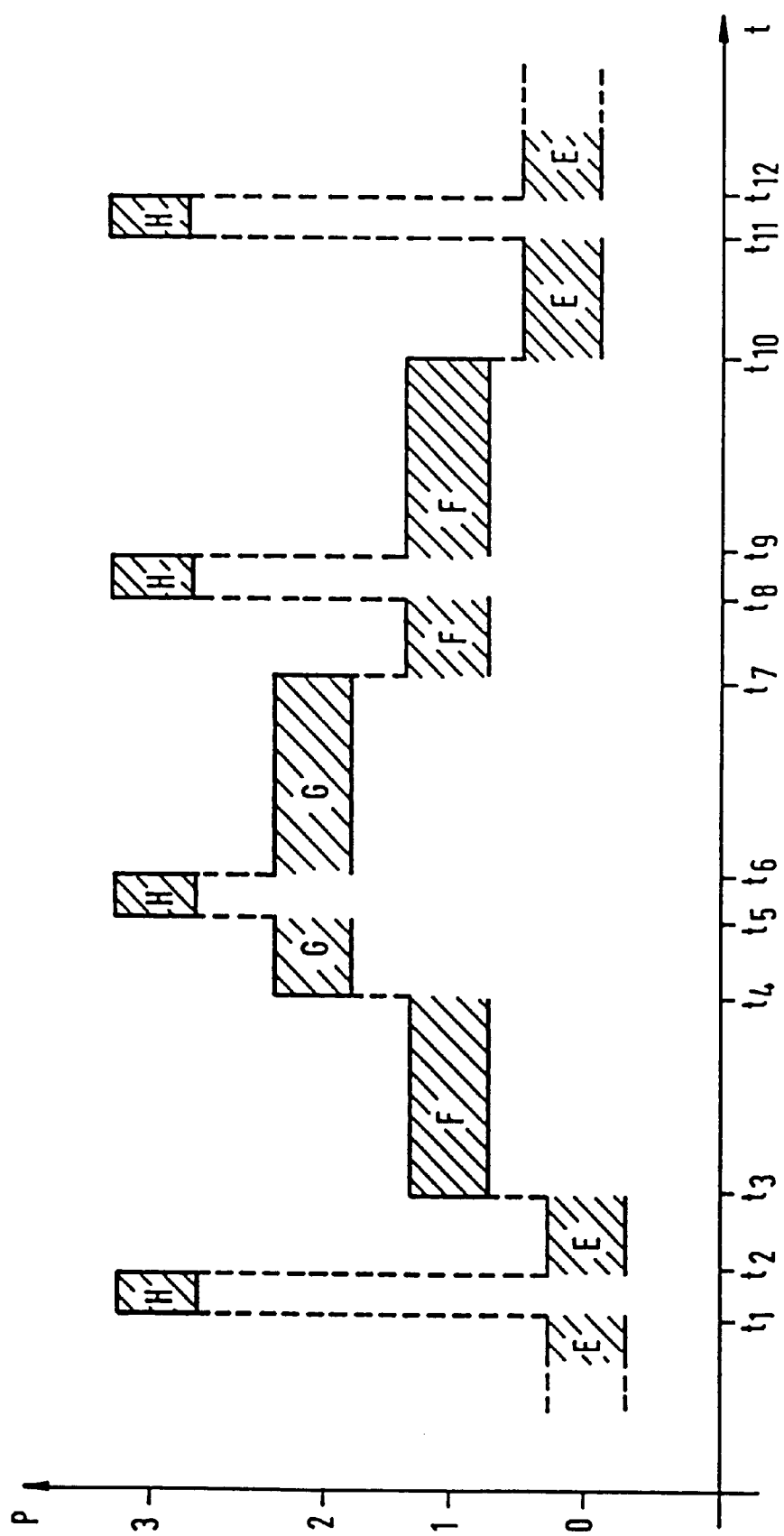
FIG. 2 shows a schematic diagram of a possible program sequence in a motor vehicle controller, where the sequencing control of several tasks is performed by an operating system that is present in the related art.

FIG. 2 shows a detail of a possible program sequence, giving four different tasks E, F, G, and H as examples. Task E has the lowest priority 0 and should always be processed, independently of a fixed time reference, when no higher-priority task is ready for processing. Task F should be processed every 100 ms. It is assigned a priority of 1. Task G should be processed within a fixed angle reference of 180 degrees crankshaft angle. It has a priority of 2. Finally, task H is to be processed in a fixed time reference of every 10 ms. It has a priority of 3, the highest priority. With the program sequence illustrated in FIG. 2, an operating system is used for sequencing control where the individual tasks can be interrupted at any time on the basis of a request for processing a higher-priority task. Such a sequencing control corresponds to preemptive multitasking. For example, task E is interrupted at time $t_1$ and the processing of task H is begun. At time $t_2$ the processing of task H is concluded. Then the processing of task E is continued at the interrupt point. The other interrupt points of the individual tasks are shown in FIG. 2. All tasks can be interrupted by interrupt service routines of separate interrupt requests. However, this is not shown in FIG. 2 for the sake of simplicity.

Figure 3:
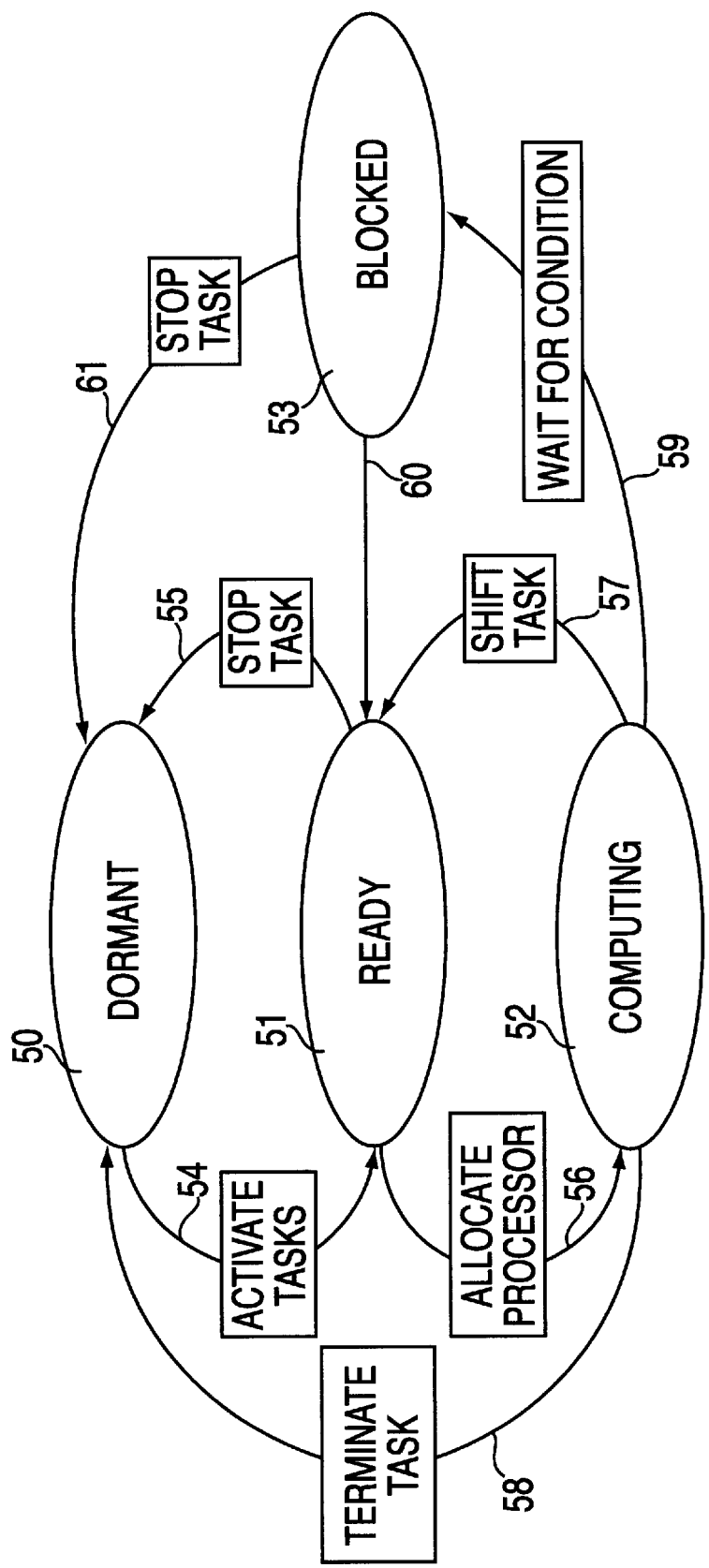
FIG. 3 shows a status diagram for tasks managed by an operating system that is present in the related art.

The individual tasks can assume different states. FIG. 3 shows the possible states that often apply to operating systems that use preemptive multitasking. Four possible states are shown. A task in the "dormant" state 50 is not occupying the processor and does not have anything to process at the time. A task in the "ready" state 50 has something to process but is not being run on the processor because the latter is busy with another task of the same or higher priority. A task goes from the "dormant" state 50 to the "ready" state 51 by "activate task" 54. A task that is ready can be reset to the dormant state 50 by "stop task" 55. By the command "allocate processor" 56, a task goes from the ready state 51 to "computing" state 52 where the processor is busy with the task. A computing task can be shifted to "ready" state 51 by a higher-priority task or it can be terminated by "terminate task" 58, when it returns to dormant state 50.

According to FIG. 3, a "blocked" state 53 is also provided in the state diagram for the tasks. A task enters this state when a certain condition must occur before it can be continued. This situation occurs, for example, when the task accesses certain computation results for its continuation but these results are supplied by another task. If the data are not yet available at the time of access, the task enters "blocked" state 53. Then the task that computes the data must be processed before the blocked task can be continued. If the computation results are available, the task leaves "blocked" state 53 and enters "ready" state 51. The transition from "blocked" state 53 to "ready" state 51 is therefore characterized by the legend "condition met" 60. The transition from "computing" state 52 to "blocked" state 53 is designated as "waiting for condition" 59.

Another example of a condition that set a task in a blocked state if it is not met involves memory allocation. For example, if a task needs additional memory for executing a complex computation but this memory is not available, then a condition is not met which blocks the task and prevents it from being continued. only when memory is made released by another task can it be allocated to the blocked task whose processing is then continued.

Figure 4:
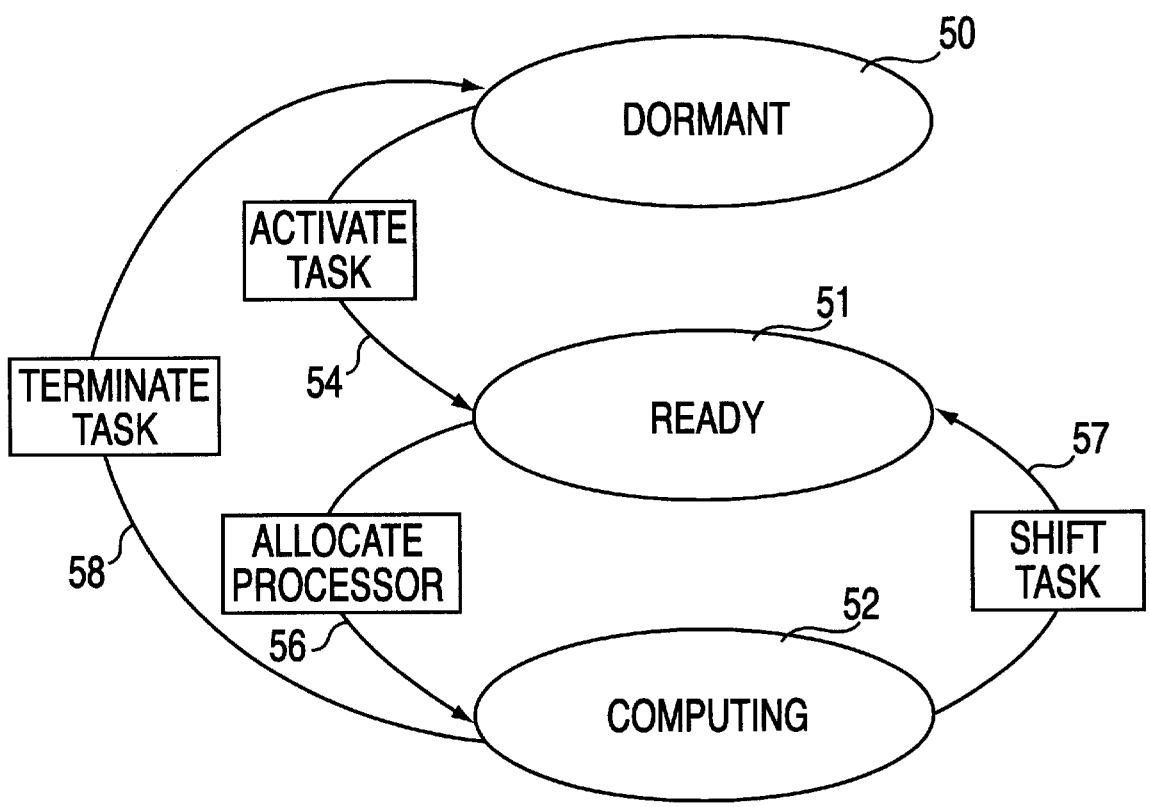
FIG. 4 shows a status diagram for tasks managed by a process according to the present invention.

FIG. 4 shows the possible states of tasks that can occur in control sequence by the process according to this invention. The three states 50, 51, 52 ("dormant," "ready" and "computing") are again allowed for the tasks. However, the "blocked" state is not allowed. This state is to be avoided intentionally because it is demanding in terms of management and requires a great deal of read-write memory. However, this is unacceptable for mass-produced controllers such as those used for controlling operations in motor vehicles. Furthermore, it is difficult to determine all possible blocking states in a complex controller program whose operating system works with task blocking and it is difficult to oversee the consequences. For example, mutual dependence can thus easily lead to "crashes," i.e., to sequence errors. The transition arrows drawn in FIG. 4 correspond to those in FIG. 3 and therefore will not be discussed again.

Figure 5:
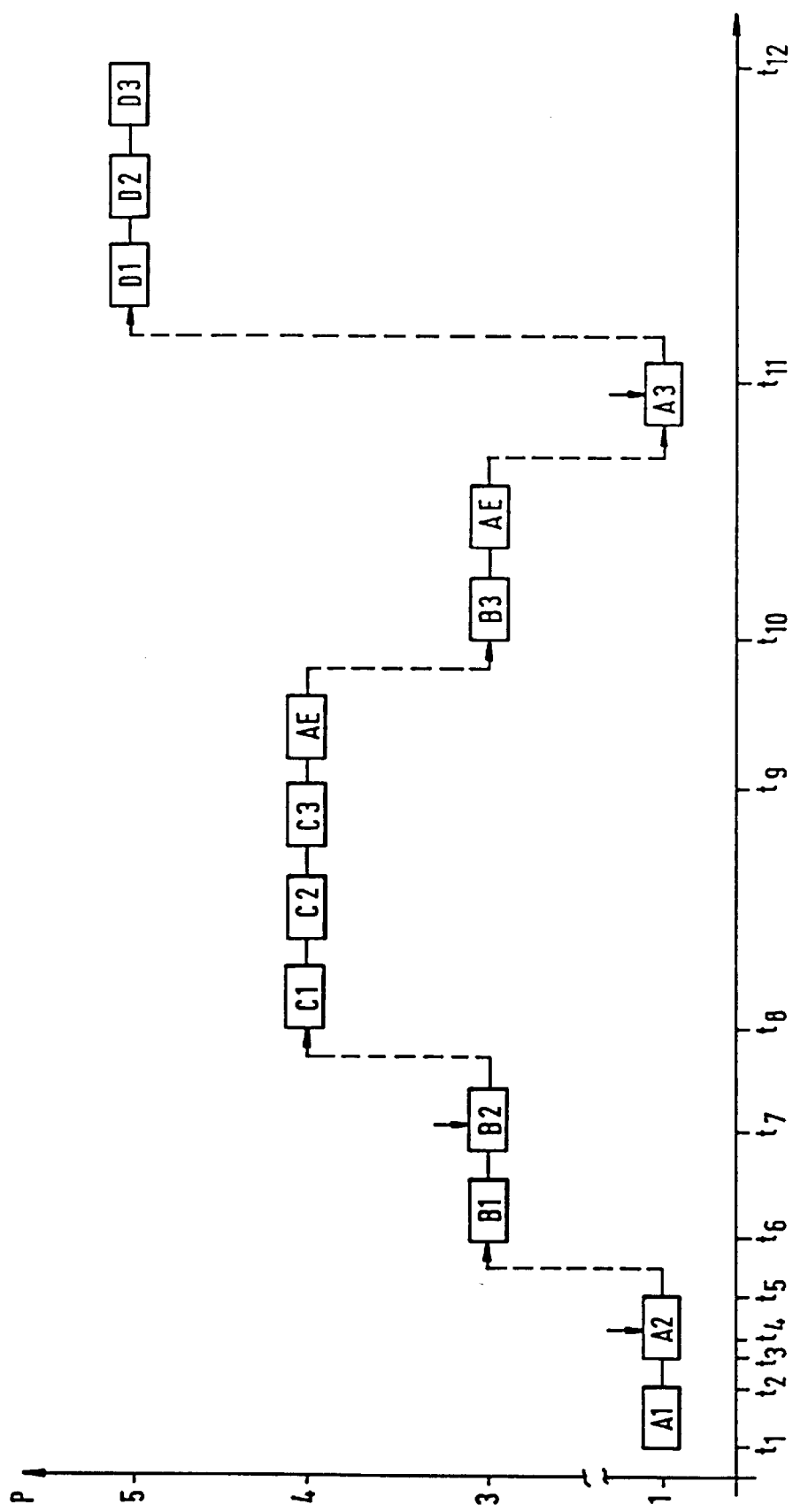
FIG. 5 shows a schematic diagram of a possible program sequence in a fuel injection system for an internal combustion engine, where the sequencing control operates according to cooperative multitasking as described in the process according to the present invention.

FIG. 5 shows a possible program sequence for fuel injection control in an internal combustion engine. This diagram shows an example of division of a complex control program into four different tasks. Task A contains all the instructions of the complex control program that are to be processed by a time-controlled method with a period of 200 ms. Task A is assigned a priority of 1. Task A is divided into three subtasks A1, A2, A3 according to the present invention. The engine temperature is determined in subtask A1 by analyzing the signal of engine temperature probe 15 and converting it to an engine temperature. A mixture enrichment factor is calculated in subtask A2 as a function of the engine temperature. This mixture enrichment factor is needed for the warm-up phase of the combustion engine after a cold start of the engine. In subtask A3 the intake air temperature is determined by analyzing the signal of the intake air temperature probe 16. Since the engine temperature as well as the intake air temperature change slowly, it is sufficient to determine these values again only every 200 ms. For this reason, subtasks A1, A2 and A3 are assigned to task A which is to be processed only at intervals of 200 ms.

Task B, however, is to be processed much more frequently. It is to be executed every 10 ms by a time-controlled method. It is assigned a priority of 3 and is subdivided into three subtasks B1, B2 and B3. Lambda control is executed in subtask Bi, where the injection time precalculated by the controller in other subtasks is corrected if necessary so that the air/fuel ratio differs only minimally from the ideal ($\lambda=1$). Adaptive corrections in the mixture are calculated in subtask B2. An adaptation algorithm based on analyzing the signal of oxygen probe 18 computes corrections for the values determined from a basic table for the fuel demand at a certain operating point of the combustion engine and enters these values in a correction table. Thus, aging phenomena and manufacturing tolerances of the engine and the injection system parts can be compensated for individually.

In subtask B3 the engine speed is calculated by analyzing the speed signal at input 19.

Task C is executed every 180 degrees of crankshaft angle with respect to a reference point on the crankshaft. This applies to a four-cylinder internal combustion engine. Task C is assigned a priority of 4. Subtask Cl calculates the motor load from the current engine speed and the position of the throttle valve, which is determined with the help of throttle valve potentiometer 17, and from the current intake air temperature.

The fuel demand for the current operating point of the combustion engine is calculated in subtask C2. The basic fuel demand is obtained from a basic table compiled from the engine rpm and the engine load as engine parameters.

In subtask C3 the enrichment and depletion factors determined are recalculated into the basic fuel demand on the basis of special operating phases as well as the corrections calculated in lambda control. Then the fuel demand is converted to an injection time for the electromagnetic injection valve. The injection pulses are then finally triggered with the support of a special circuit containing a counter that is set according to the calculated injection time. This does not require a separate subtask.

Task D is event-controlled and is activated only when the ignition is switched off. It is assigned a priority of 5, which is the highest. It is subdivided into subtasks D1, D2 and D3. In subtask Di the injection valve and the fuel pump are switched off. In subtask D2 the corrections entered in the correction table are programmed into the non-volatile memory 22.

In subtask D3 controller 10 is switched off.

All the tasks and subtasks illustrated here can be interrupted by interrupt programs if no special blocks for interrupt requests have been programmed. The timing of tasks A and B is then also controlled with the help of interrupt requests. This uses time counter 23 in controller 10 that is incremented in the interrupt service routine of an interrupt generated periodically by the hardware, e.g., every millisecond. In this interrupt service routine, a list with the activation times. for tasks A and B is scanned. If an entry in this list corresponds to the current count of time counter 23, the corresponding task is activated. However, this will be discussed in greater detail below. The list with the entries of activation times for programs A and B is designed as an interlinked list. Therefore, only the first element of the interlinked list needs to be compared with the current counter status. Only when the first element on the list matches the current count is it necessary to compare the following elements on the list with the list count until there is no longer a match.

Figure 6:
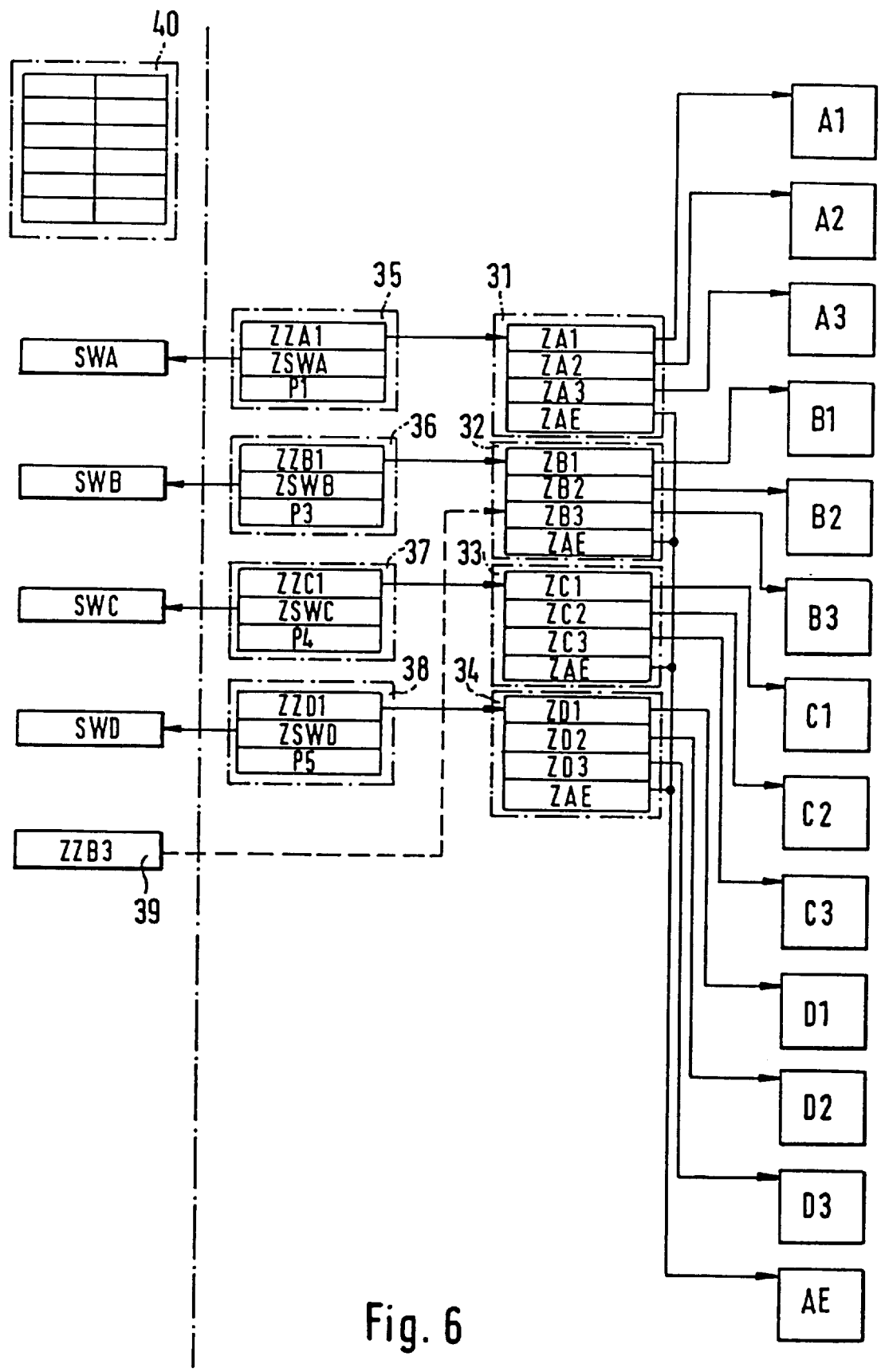
FIG. 6 shows a first schematic diagram of a sequencing control using pointers and tables in the process according to the present invention.

Implementation of the process according to the present invention will now be explained with reference to FIGS. 5 through 7. The division of individual tasks A, B, C and D into a plurality of subtasks is performed by the software developer. The respective program code is entered in read-only memory 13 of the controller after completion of the program. Therefore, the individual subtasks A1 through D3 are entered separately in the read-only memory of controller 10. This is indicated in FIG. 6. This diagram has been simplified inasmuch as subtasks A1 through D3 are all shown as the same size. However, they may also be of different sizes. A subtask program pointer table 31 through 34 is provided for each task. These tables are also permanently stored in read-only memory 13. For each subtask of the respective task, a pointer indicating the start of the program code of the respective subtask is entered in each subtask pointer table. Table 33 for task C can be used as an example. This table has a subtask pointer ZC1 indicating the start of the program code for subtask C1. In addition, a subtask pointer ZC2 is also provided, indicating the start of subtask C2. Finally, subtask ZC3 is also provided, indicating the start of subtask C3.

At the end of each subprogram pointer table 31 through 34 there is also a pointer ZAE indicating a subtask AE that is important for sequencing control. Its function will be explained in greater detail below.

In addition, descriptive data structures 35 through 38 (task descriptors) are also provided in read-only memory 13, which contains information on the priority P1 through P5 of each task, a pointer ZZA1 through ZZD1 pointing to the first subtask pointer ZA1 through ZD1 of the respective subtask pointer table 31 through 34 and a pointer ZSWA through ZSWD pointing to a status word of the respective task. The individual status words SWA through SWD of the tasks are stored in read-write memory 12 of controller 10. The status words of the tasks are stored in read-write memory 12 of controller 10 because they undergo variable program entries while the program is running. Task C will again be considered as an example of the entries in a task descriptor 35 through 38. Pointer ZZC1 points to the first entry in table 33, i.e., to subtask pointer ZC1. Pointer ZSWC points to the status word of task SWC. Furthermore, the fact that task C is assigned a priority of 4 is also entered in task descriptor 37 for task C. The entries in task descriptors 35, 36 and 38 can be seen from FIG. 6 without further explanation.

In addition, read-write memory 12 also contains sequencing control table 40 where a pointer ZDA through ZDD indicating the start of the respective task descriptor is entered according to priority level for each activated task, i.e., a task that is "ready" or "computing," and also a pointer pointing at pointer ZA1 through ZD3 of the subtask Al to D3 with which a task that is ready to be continued after an interruption between subtasks. Thus, when a task is interrupted, a pointer indicating the subtask pointer designating the next subtask after the interruption is entered in sequencing control table 40. If a task has gone from "dormant" to "ready," sequencing control table 40 will contain a pointer indicating the first subtask pointer ZA1 through ZD1 of the corresponding subtask pointer table 31 through 34 for this task. The sequencing control table is initialized with zero pointers when the program is initialized.

Finally, one more pointer 39 is provided in read-write memory 12 of controller 10. This table pointer 39 is always set so that it points to the subtask pointer of the subtask to be processed next. In the example shown here, table pointer 39 points to subtask pointer ZB3. Subtask B3 is thus the next to be processed. Table pointer 39 is incremented after each processing of a subtask. In a part of the program called a "dispatcher" that is run after completing the processing of a subtask each time, the next subtask selected for processing is the one indicated by the table pointer before being incremented. This procedure is explained again in greater detail below on the basis of the program illustrated in FIG. 5.

Microprocessor 11 starts processing subtask A, at time $t_1$, at which point there is an entry ZZA2 available in table pointer 39. The next subtask to be processed is thus subtask A2. Subtask Al is concluded at time $t_2$. In the following dispatcher run, table pointer 39 is incremented so it receives entry ZZA3, and at time $t_3$ the subtask selected by table pointer 39 before being incremented by pointer concatenation (ZZA2→ZA2→A2) is called. This is subtask A2. At time $t_4$ the interrupt service routine of time counter 23 establishes that task B should be activated at this time. To this end, it calls up the operating system service that is responsible for task activation, which enters pointer ZDB on task descriptor 36 and pointer ZZB1 on subtask pointer ZB1 in sequencing control table 40 at priority level 3. Since task B is now the highest-priority ready task in the system, a change to this task at the end of task A2 that is currently running is prepared by loading table pointer 39 with the value ZZB1. Since task A is interrupted while being run, pointer ZZA3 is entered at priority level 1 so that task A can be continued later with subtask A3. Entries for the other priority levels remain unchanged, i.e., zero pointers are entered there. The entries in sequencing control table 40 are shown in FIG. 7.

According to the present invention, subtask A2 is only then processed completely. The processing of subtask A2 is completed at time $t_5$. Then the dispatcher is run again, incrementing table pointer 39. After being incremented, table pointer 39 points to the value ZZB2. Task A thus changes from the "computing" status to the "ready" status. Processing of subtask B1 is then begun at time $t_6$.

At time $t_7$ an interrupt request is sent to microprocessor 11 on the basis of the incoming engine speed signal. This interrupt signal indicates that the angle interval of 180° crankshaft angle is completed. In the respective interrupt service routine, the operating system service that activates task C and updates sequencing control table 40 accordingly is called up. For priority level 4, pointer ZDC is entered at the start of task descriptor 37 and pointer ZZC1 is entered at subtask pointer ZC1 of task C. Task C is thus activated. Since task B is interrupted after processing subtask B2, pointer ZZB3 is entered at priority level 3. The entries described can be seen in FIG. 7. Finally, table pointer 39 is set at value ZZC1 according to the highest entry in sequencing control table 40. After the end of processing of subtask B2, subtask C1 is processed next accordingly. The change between these subtasks takes place in the same way as described for the change between subtasks A2 and B2. Processing of subtask Cl takes place at time ta. Task C is completed without a request for processing another task in the meantime.

After termination of task C at time $t_9$, the dispatcher is run again, incrementing table pointer 39 and calling up the next subtask to be processed, which is selected by the value of table pointer 39 before being incremented. It is subtask AE which is called up to terminate a task. Sequencing control table 40 is updated here. Since task C is terminated, zero pointers are entered in sequencing control table 40 at priority level 4. Then pointer ZZB3 is removed from sequencing control table 40 and entered in table pointer 39. At this time, task B has the highest priority of all tasks in a "ready" state. Then at time $t_{10}$ subtask B3 is processed. After this processing, subtask A3 is called up again and zero pointers are entered at priority level 3 in sequencing control table 40. Pointer ZZA3 pointing to subtask pointer ZA3 is entered in table pointer 39.

By turning the ignition key to the "off" position, microprocessor 11 of the controller receives the signal via input 20 at time $t_{11}$ that the ignition is to be turned off and the control program is to be terminated. In the respective interrupt service routine, the operating system service responsible for activation of tasks is called up again, entering pointer ZDD at the start of task descriptor 38 and pointer ZZD1 at the first subtask pointer ZD1 at priority level 5 in sequencing control table 40. This takes place as described above for activation of tasks B and C.

By loading table pointer 39 with address ZZD1 of subtask pointer ZD1, changing task D now having the highest priority to ready is prepared. The change takes place after termination of subtask A3 which is being processed.

Then tasks D1, D2, and D3 are processed in sequence, as described above. No more task changes take place, and sequencing control table 40 is no longer updated. At time $t_{12}$ the program sequence is completely terminated. The fuel injection controller is turned off.

Figure 8:
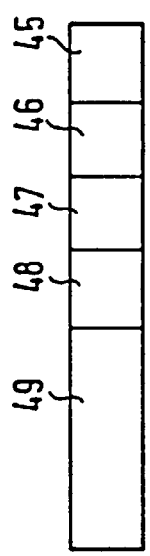
FIG. 8 shows a formal structure of the status word of a task.

FIG. 8 shows the general structure of a status word for a task. If a "1" is entered in memory position 45, this means that the respective task is in the "dormant" state. If a "1" is entered in memory position 46, this means that the respective task is in the "ready" state. If a "1" is entered in memory position 47, this means that the respective task is in the "computing" state. If a "1" is entered in memory position 48, this means that the respective task has been interrupted. Memory positions 49 are provided for a waiting list index entry. If processing of a task is requested anew, it may happen that the operating system service responsible for activation finds that a task having the same priority has already been activated—the corresponding entry in the sequencing control table is not equal to zero. In this case the newly activated task is inserted in a waiting queue, and information indicating which position this task has in the queue for this priority level is entered in its status word. Then in a subsequent search for the task with the highest priority for the case when several programs with the same priority are activated, the position of the respective task within the queue is also taken into account. In these cases the task having the longest waiting time is always the next to be executed. Accordingly, sequencing control table 40 must then also be enlarged so that pointers to the start and end of a queue ordered according to waiting time for tasks can be entered for each priority level. Zero pointers indicate that there are not currently any tasks waiting at this priority level.

Figure 9A:
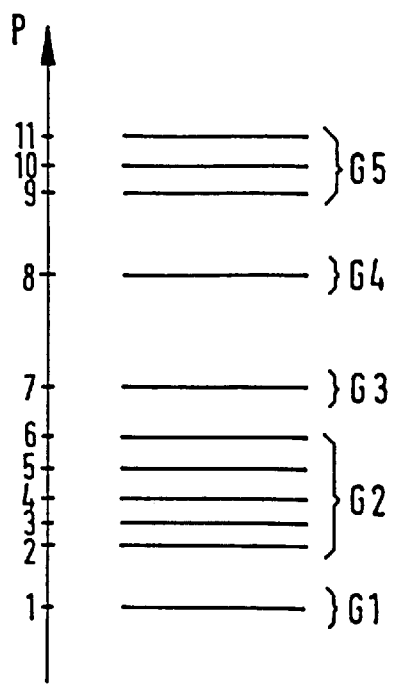
FIG. 9a shows a schematic diagram of the subdivision of the priority scale for tasks of a complex control program into priority groups for configuring a combination of preemptive and cooperative sequencing control processes according to the present invention.

An embodiment where not all tasks are processed by the sequencing control principle according to the present invention (interruption only between subtasks that have been completed) is discussed below. In this embodiment of the combined sequencing control process according to the present invention, some tasks are allowed to interrupt other lower-priority tasks at any point, i.e., they are managed according to the sequencing control principle known as preemptive scheduling. Thus with the combined sequencing control process according to the present invention, there are tasks that can interrupt other lower-priority tasks at any point and there are also tasks that can interrupt other lower-priority tasks only between subtasks that have been completed. This situation is illustrated in FIG. 9a, where the tasks and their respective priorities are represented by a line on a priority scale. The tasks are divided into priority groups G1–G5. Priority group G1 consists of those tasks that have the same priority level 1. Priority group G2 consists of tasks having a priority of 2 to 6. Priority group G3 consists of tasks having a priority of 7. Priority group G4 consists of tasks having a priority of 8. Priority group G5 concerns all tasks having a priority of 9 to 11. Then the following applies to sequencing control with this division of tasks: a task of priority group G2 can interrupt a lower-priority task of the same priority group G2 only between two subtasks that have been concluded. Thus, if a request for a task from priority group G2 appears during the processing of a task from the same priority group G2, the task being run at that time is not interrupted directly but instead is interrupted only after processing of the subtask being processed. However, if a task of priority group G1 is in the "computing" state and there is a request for processing a task from priority group G2, the task being run at the time is interrupted immediately (preemptively). For example, if a task of priority group G2 is in the "computing" state and there is a request for processing a task of priority group G4, the task being executed at that time is again interrupted immediately. A higher-priority task from priority group G5 cannot immediately interrupt a lower-priority task from the same priority group G5 but instead the interrupt may occur only between completed subtasks.

Figure 9B:
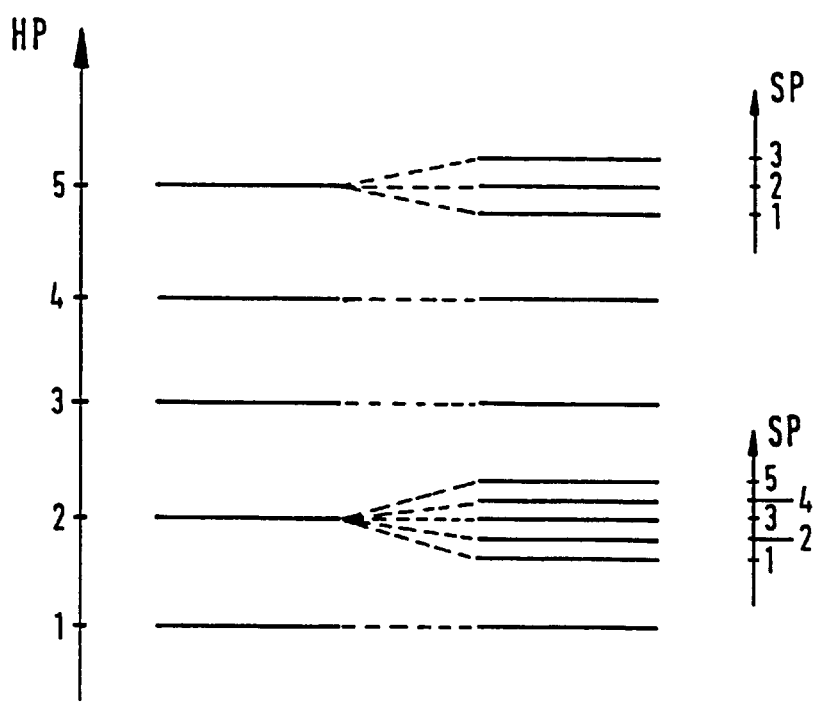
FIG. 9b shows another diagram of the same subdivision as illustrated in FIG. 9a using main priorities and sub-priorities.

FIG. 9b shows a similar diagram as illustrated in FIG. 9a. A task here is assigned not only a priority level but optionally also a subpriority level. No subpriorities are provided for main priority levels 1, 3, 4. These special cases correspond to a "degenerate" priority group G1, G3, G4 having only one element.

Figure 10:
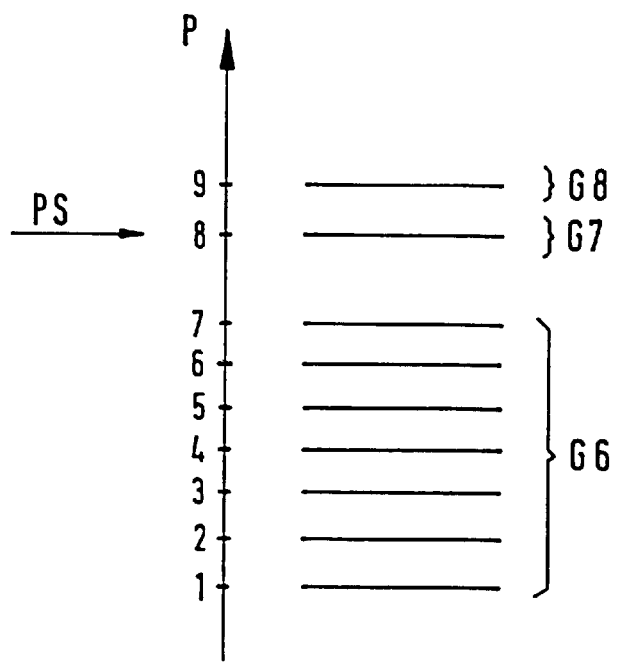
FIG. 10 shows yet another example of subdividing the priority scale for tasks of a complex control program into priority groups.

FIG. 10 shows another division of tasks of a typical complex control program into priority groups. Priority group G6 consists of all tasks of priority levels 1–7. This means that priority group G6 includes all tasks that are subject to low to moderate real-time requirements. For that reason these tasks also have the lowest priorities. All tasks with very strict real-time requirements and therefore a high priority are combined in degenerate priority groups G7 to G8, each of which has only one priority level. Thus there is a priority threshold PS here such that all tasks having a priority equal to or higher than this threshold can interrupt any other lower-priority tasks at any point (preemptively). Due to the fact that only a few tasks have permission to interrupt other tasks at any point (preemptively), the RAM demand for the stack and the demands of synchronizing tasks and assuring data consistency can be kept within reasonable limits.

Figure 7:
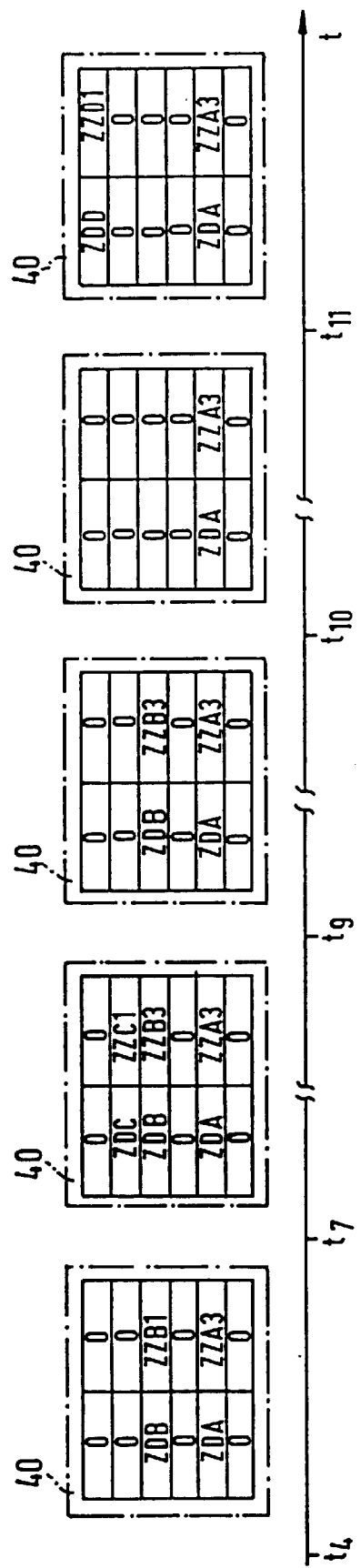
FIG. 7 shows a second schematic diagram of a sequencing control using pointers and tables in the process according to the present invention.

The mixed sequencing control for the division of tasks as shown in FIG. 10 can be implemented in an operating system for the controller such that the sequencing control method described with regard to FIGS. 6 and 7 runs on the lowest priority of a preemptive sequencing control system known in the related art.

Figure 11A:
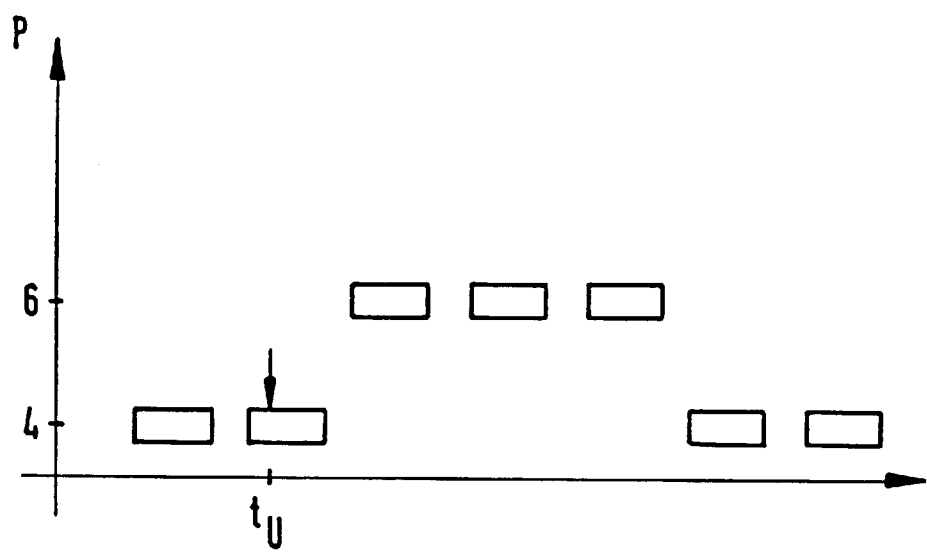
FIG. 11a shows a first example of interrupting a task by a higher-priority task.
Figure 11B:
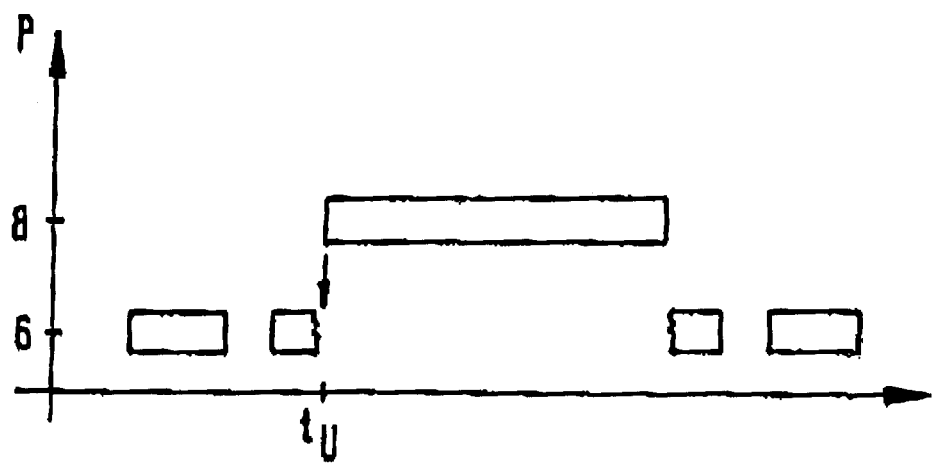
FIG. 11b shows a second example of interrupting a task by a higher-priority task.
Figure 11C:
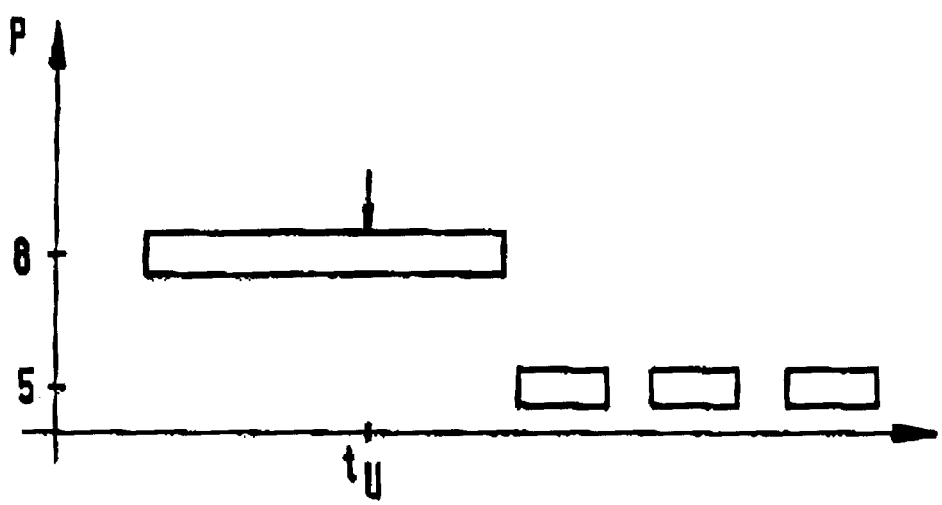
FIG. 11c shows an interruption request by a task having a lower priority than the task currently being processed.

FIGS. 11a, 11b, 11c ahow three possible cases of interrupt requests in combination with the division of tasks as shown in FIG. 10. In FIG. 11a, a task from priority group G6 is processed. This task is divided into subtasks. Processing of a task of priority level 6 is requested at time $t_U$. However, this task cannot immediately interrupt the task being executed at that moment, so first the subtask of the task being executed is concluded before the task of priority level 6 can be processed.

FIG. 11b shows a case where a task of priority level 6 is currently being processed. At time $t_U$, a request for processing a task of priority level 8 is issued. This task immediately interrupts the task currently being executed and is itself processed immediately. The interrupted subtask is then continued.

FIG. 11c shows a case where a task of priority 8 is being processed. At time $t_U$ a request for processing of a task of priority level 5 is issued. In this case there is no interruption of the task being executed. Instead, the task being executed is first processed completely and then the task from priority group G6 is processed.

The present invention is not limited to the embodiment described herein. In particular, it is not limited to applications in automotive controllers. An operating system according to the present invention can also be used, for example, in computer systems for process control (such as chemical processes), for industrial control systems (machine tools, robots, etc.) or in control systems for household appliances (washing machines, etc.). It is also advantageous to use the process according to the present invention when the operations or processes are to be controlled/regulated in real time.

The division of the complex control program into several tasks and division of at least some of the tasks into various subtasks will depend on the given application and can vary greatly in type and number.

The use of pointers as references to data objects is not obligatory for implementation of the process according to this invention. Instead of that, the data objects can also be organized into tables so the table index of data objects can serve as a reference.

What is claimed is:

1. A method for controlling technological operations or processes, comprising the steps of:
- (a) providing a control program, the control program including control program tasks, each of the control program tasks being assigned a corresponding priority and a corresponding activation event, at least one of the control program tasks being subdivided into corresponding subtasks;
- (b) processing a first task of the control program tasks using a microprocessor of a controller;
- (c) receiving a request to process a second task of the control program tasks, a priority of the second task being higher than a priority of the first task;
- (d) as a function of the request for processing the second task, storing a table pointer with information associated with an address of a first subtask of the second task;
- (e) interrupting step (b) as a function of the request for processing the second task, step (e) being delayed until an executing subtask of the first task during which the request for processing of the second task was issued is completed;
- (f) processing the first subtask of the second task as a function of the stored table pointer after the executing subtask of the first task is completed; and
- (g) resuming the step of processing the first task after the second task is completed.

2. The method according to claim 1, wherein the technological operations and processes are controlled in a motor vehicle.

3. The method according to claim 1, further comprising the step of:
- ordering the corresponding subtasks of at least one of the at least one of the control tasks based on a sequencing criteria, the sequencing criteria being a function of at least one of a related urgency, synchronization conditions between the corresponding subtasks and the corresponding activation event.

4. The method according to claim 3, wherein the corresponding activation event includes one of a program start, a program end, a time period sequence, an angle period sequence, an occurrence of internal events and the occurrence of external events.

5. The method according to claim 3, wherein a time for processing each of the corresponding subtasks of the at least one of the control program tasks does not exceed a predetermined time limit.

6. The method according to claim 1, further comprising the steps of:
- providing at least one subtask pointer table for the at least one of the control program tasks, the at least one subtask pointer table including a respective subtask pointer pointing to a start of each of the corresponding subtasks of the at least one of the control program tasks;
- pointing the table pointer to a next subtask pointer in the at least one subtask pointer table;
- after processing a next subtask pointed to by the next subtask pointer, incrementing the table pointer by a predetermined value so that it points to another next subtask pointer in the at least one subtask pointer table; and
- processing another next subtask pointed to the another next subtask pointer.

7. The method according to claim 6, further comprising the steps of:
- pointing a last subtask pointer of the at least one subtask pointer table to a predefined subtask;
- processing the predefined subtask; and
- while processing the predefined subtask, pointing the table pointer to a valid subtask.

8. The method according to claim 1, further comprising the step of:
- assigning a respective descriptive data structure to each respective one of the at least one of the control program tasks, the respective descriptive data structure including the corresponding priority of the respective one of the at least one of the control program tasks, a starting pointer indicating a start of a respective subtask pointer table and a processing status of the one of the at least one of the control program tasks, an address of each respective descriptive data structure serving as a reference and identifier for the respective one of the at least one of the control program tasks.

9. The method according to claim 1, wherein each of the control program tasks have only a dormant state, a ready state and a computing state.

10. The method according to claim 8, further comprising the step of:
- providing a sequencing control table to manage the control program tasks requested for processing, the sequencing control table being organized based on priority level, the sequence control table including, for each priority level, a first pointer pointing to the respective descriptive data structure of each of the requested control program tasks at the priority level and a second pointer pointing to a subtask pointer table, the subtask pointer table pointing to the corresponding subtasks of the requested control tasks at the priority level, the second pointer being used to start the requested control program tasks when there is a task change or to be continued after an interruption. zero pointers being entered in the sequencing control table when no task is requested for processing at the corresponding priority level.

11. The method according to claim 10, further comprising the steps of:
- for each one of the requested control program tasks whose corresponding priority is lower than a priority of a highest-priority task being requested for processing, storing the first pointer pointing to the descriptive data structure assigned to the one of the requested control program tasks and the second pointer representing a start of the respective subtask pointer tables in the sequencing control table at the priority level corresponding to the corresponding priority of the one of the requested control program tasks; and
- for each one of the requested control program tasks whose corresponding priority that is higher than the priority of the highest-priority task being requested for processing:
- storing a current value of the table pointer in the sequencing control table at the priority level corresponding to the corresponding priority of the highest-priority task being requested for processing,
- storing the first pointer pointing to the descriptive data structure assigned to the one of the requested control program tasks and the second pointer pointing to the start of the respective subtask pointer table of the one of the requested control program tasks at the priority level corresponding to the corresponding priority of the one of the requested control program tasks, and pointing the table pointer to a first subtask pointer of the respective subtask pointer table of the one of the requested control program tasks to prepare for a changing of tasks after the executing subtask is completed.

12. The method according to claim 11, wherein after each one of the requested control program tasks is completed, respective entries in the sequencing control table at the priority level corresponding to the corresponding priority of the one of the requested control program tasks are deleted, and the sequencing control table is searched in a direction of decreasing priority to locate one of the requested control program tasks whose corresponding priority is highest, the table pointer being loaded with a value from the sequencing control table at the priority level corresponding to the one of the requested control program tasks whose corresponding priority is highest and aligned at a subtask pointer of the subtask pointer table of the one of the requested control program tasks whose corresponding priority is highest to convert the one of the requested control program tasks whose corresponding priority is highest to a computing state at a next change in subtasks.

13. The method according to claim 10,
wherein the sequencing control table further includes a first-in-first-out (FIFO) memory for each priority level so that a further task that has a same corresponding priority as the corresponding priority of any of the requested control program tasks can be requested for processing, a pointer pointing to the respective descriptive data structure assigned to the further task being stored in the FIFO memory when the further task is requested, wherein after any requested control program task whose corresponding priority is the same corresponding priority as the further task is completed, a pointer pointing to the respective descriptive data structure assigned to a control program task having a longest waiting time is deleted from the FIFO memory and is stored in the sequencing control table, and
wherein the control program task having the longest waiting time is converted to a computing state at a next subtask change if no request for processing a higher-priority task has been issued by pointing the table pointer to the first pointer of the subtask pointer table corresponding to the control program task having the longest waiting time.

14. The method according to claim 1, further comprising the steps of:
providing an interrupt point in at least one of the corresponding subtasks of at least one of the control program tasks, the at least one of the corresponding subtasks being otherwise uninterruptible by further tasks;
interrupting the at least one of the corresponding subtasks by calling up at the interrupt point an operating system subprogram for triggering the processing of a control program task having a higher priority than the corresponding priority of the at least one of the corresponding subtasks; and
returning to the at least one of the corresponding subtasks for processing after processing the control program task having the higher priority, wherein temporary data of the at least one of the corresponding subtasks is stored in a stack.

15. The method according to claim 14, wherein the interruption point is in the at least one of the corresponding subtasks so that a time for processing portions of the at least one of the corresponding subtasks separated by the interruption point does not exceed a predetermined time limit.

16. The method according to claim 14, further comprising the step of:
providing tasks capable of interrupting lower-priority tasks at any point.

17. The method according to claim 16,
wherein the control program tasks are combined into non-overlapping priority groups, one of the priority groups including tasks of the control program tasks having adjacent priority levels,
wherein a task of one priority group may only interrupt a lower-priority task of the same priority group at least one of i)between two subtasks of the first priority group, and ii) at the interruption point,
wherein a task of one priority group may interrupt the lower-priority task from a second priority group at any point, and
wherein a task of one priority group may not interrupt a task having the same or higher priority of any priority group.

18. The method according to claim 17, wherein all of the control program tasks whose corresponding priority is below a predefined priority threshold are combined into a first priority group, wherein all remaining tasks of the control program tasks form separate priority groups, all tasks in each of the separate priority groups having the same corresponding priority.

19. A method for controlling technological operations or processes, comprising the steps of:
(a) providing a control program, the control program including control program tasks, each of the control program tasks being assigned a corresponding priority and a corresponding activation event, at least a first and a second of the control program tasks being subdivided into corresponding subtasks;
(b) processing a first task of the control program tasks using a microprocessor of a controller;
(c) receiving a request to process the second task of the control program tasks, a priority of the second task being higher than a priority of the first task;
(d) as a function of the request for processing the second task, storing a table pointer with information associated with an address of a first subtask of the second task;
(e) interrupting step (b) as a function of the request for processing the second task, step (e) being delayed until an executing subtask of the first task during which the request for processing of the second task was issued is completed;
(f) processing the second task as a function of the stored table pointer after the executing subtask of the first task is completed;
(g) receiving a request to process a third task of the control program tasks, a priority of the third task being higher than a priority of the first and second task;
(h) as a function of the request for processing the third task storing a table pointer with information associated with an address of a first subtask of the third task;
(i) interrupting step (f) as a function of the request for processing the third task, step (i) being delayed until an executing subtask of the second task during which the request for processing the third task was issued is completed;
(j) processing the first subtask of the third task as a function of the stored table pointer after the executing subtask of the second task is completed;

(k) resuming the step of processing the second task after the third task is completed;

(l) resuming the step of processing the first task after the second task is completed.

20. A method for controlling a technological operation or process, comprising:

(a) providing a control program, the control program including a first control program task and a second control program task, each of the first control program task and the second control program task being assigned a corresponding priority and a corresponding activation event, each of the first control program tasks and the second control program tasks being subdivided into corresponding subtasks;

(b) selecting for processing a first one of the subtasks of the first task using a table pointer, the table pointer including information about an address of the first one of the subtasks of the first task;

(c) processing a first one of the subtasks of the first task using a microcontroller;

(d) before processing the first one of the subtasks of the first task, receiving, by the table pointer, information regarding an address of a next one of the subtasks of the first task;

(e) if, during the processing of the first one of the subtasks, a request to process the second task is received, and the second task has a higher priority than a priority of the first task, (i) receiving, by the table pointer, information regarding an address of a first one of the subtasks of the second task, (ii) after processing the first one of the subtasks of the first task, selecting for processing the first one of the subtasks of the second task using the table pointer, (iii) processing the first one of the subtasks of the second task, (iv) receiving, by the table pointer, information regarding an address of a next one of the subtasks of the second task, (v) after a completion of the processing of a subtask being processed, selecting the next one of the subtasks of the second task using the table pointer;

(vi) processing the next one of the subtasks of the second task, (vii) repeating steps iv–vi until a last one of the subtasks of the second task has been processed, and (viii) before processing the last one of the subtasks of the second task, receiving, by the table pointer, the information regarding then address of the next one of the subtasks of the first task; and (f) after step (e), processing the next one of the subtasks of the first task.

\* \* \* \* \*